United States Patent Office 3,600,201
Patented Aug. 17, 1971

3,600,201
HARD FACING ALLOY COMPOSITION AND
METHOD OF MANUFACTURE
Samuel P. Alessi, Homewood, Ill., assignor to
Borg-Warner Corporation, Chicago, Ill.
No Drawing. Filed Nov. 29, 1968, Ser. No. 780,204
Int. Cl. C09d 1/00; C23c 3/00
U.S. Cl. 106—1
6 Claims

ABSTRACT OF THE DISCLOSURE

A hard facing composition is disclosed herein which contains carbon, chromium, nickel, silica, manganese, boron and iron. The composition is applied to metal surfaces to provide a fused metallic hard facing on the surface when the material is heated to melting temperature.

SUMMARY OF THE INVENTION

This invention relates to a cladding and a hard facing composition wherein a slurry is provided by mixing a powder formed from a single homogeneous alloy containing carbon, chromium, nickel, silica, manganese, boron and iron, with powdered fluxes, a liquid vehicle such as water, and suspension agents for suspending the powder in the liquid. The resulting slurry is adapted for application to metallic surfaces so that when said surfaces are subjected to an elevated temperature sufficient to fuse the slurry into the surface, the surface will be provided with a uniform wear-resistant portion thereon. In addition, the slurry thus provided has a uniform and substantially lower melting point than tungsten carbide which is the most expensive and yet the most commonly used element used in hard facing. Thereby, the slurry of this invention provides substantially economic as well as service advantages and improvements, as will be elaborated on below.

This composition is provided by the powder from a single alloy, and is thereby sufficiently homogeneous to avoid any necessity for violent agitation when mixed with water and the suspension agents to maintain a uniform and homogeneous composition during the slurry application to the part and during the fusion process. Also, the slurry is of such a fine and small sieve mesh size so as to provide the most uniform microconstituent structure and grain structure, and thereby tending to prevent erosion and separation of the particles thereof by the slurry fluid during application of the slurry to the implement and of erosion by undercutting by field wear during service application of the fused hard face cutting edge.

In the past, it is the known practice to provide a hard faced surface on implements subject to abrasive conditions so as to extend the life of the implement. This is particularly applicable in tillage implements where the abrasive forces are derived from soil in working engagement with the implements.

A typical approach for providing a hard face surface is to prepare a composition to be applied to the abrasive area of an implement. In particular, one such general approach is to admix or embed hard wear-resistant refractory granules having a high temperature melting point. The melting or fusion temperature of these refractory materials is substantially higher than the normal base metal to which it is applied. This generally prevents the direct application of such highly refractory, expensive and abrasive-resistant materials to the base steels of the implement. It, therefore, has been necessary to apply them to the base metal by the use of a base matrix having a lower melting point similar to that of the base metal of the service part.

The implement with the wear-resistant material and base matrix is then subjected to an elevated temperature sufficient to fuse the base matrix metal composition to the metal of the implement to retain the refractory abrasive-resistant material; to fuse the matrix metal to the base metal; and to thereby mechanically retain the highly wear-resistant refractory metal to the base metal through the matrix metal or matrix metal composition.

Another generally known means for providing a hard facing surface on metallic implements necessitates a multi-constituent compound whereby a liquid adhesive is applied to the surface of the metal. Hard facing refractory and matrix particles are then sprinkled or otherwise similarly applied to the base metal. The hard facing particles are thereby temporarily mechanically retained to the metal by the adhesive and are subsequently subjected to an elevated temperature by furnace, electrical spark or arc, or oxyacetylene flame, sufficient to cause fusion of the matrix of the hard facing compound to adhere the base metal and thereby mechanically retain the refractory material. In each of the above cases, the refractory and wear-resistant material is retained in elemental and lump or particle size and globules, and does not change in composition, in particle size, nor does it diffuse into or mix in greater degree during the matrix fusion process.

In the multiconstituent composition approach, the composition to be applied to the base metal is composed of high density refractory materials and widely varied and generally lower densities of the matrix composition materials. For this reason, this approach has necessitated the development of expensive and complex mechanical apparatus and systems to continuously and violently agitate the admixture of materials to maintain a relatively uniform mechanical mixture of the constituents; otherwise, the denser refractory constituent particles would settle rapidly during application of the admixtures and would create a widely variant composition. Uniformity, among other things, is therefore lacking in such a system.

After the application of refractory materials in the manner described above, one major disadvantage in service is that the softer, much less wear-resistant matrix metal and matrix metal composition will erode and wear away far more rapidly than the embedded refractory materials causing separation of the refractory material from the metal matrix due to the lack of mechanical retention and support therefor. In addition to this erosion problem, the embedded refractory granules are, under abrasive circumstances, directly mechanically separable from the matrix metal. Because of the erosion and mechanical separation tendencies of the refractory materials, these materials are removed from useful wear-resistant use long before the abrasive qualities thereof are utilized. In fact, the inventor has found, as have others, that approximately as low as only 10% to 20% of the beneficial wear-resistant service life of these expensive refractory materials are realized and obtained in this general type of mixture and service.

Also, because of the high refractory and high hardness value of commonly used refractory materials, it is difficult to produce a degree of pulverization fine enough to homogeneously embed the materials in the matrix for satisfactory service life. For this reason, these refractory materials are normally used in a relatively coarse-grained condition which exaggerates the above-referred to particle undercutting and erosion and mechanical removal of these grains from the matrix metal.

The adhesive multiconstituent approach referred to above requires contact between the adhesive and the granules and, therefore, allows only a maximum of a saturated single layer amount of refractory material to be applied for each application of adhesive film. Therefore, if a substantial thickness is desired, this system requires multiple applications of this process resulting in great expense, repetition of the operation, and a tendency to permeate the resulting hard facing surface with impurities from the adhesive material when heated for fusing. This multiphase application of hard facing material is likewise subject to the erosion and mechanical destruction.

It is, therefore, highly desirable to provide a hard facing composition wherein a refined and single phase hard facing slurry could be provided which could be easily applied to the implement in one simple homogeneous application. Also, this slurry would most desirably be sufficiently refined and homogeneous on both a granule and compositional standpoint to maintain a uniform slurry composition without drastic stratification tendencies, so as not to necessitate violent agitation thereof. Further, the more desirable slurry would have granules of sufficiently small sieve mesh size to provide a more uniform grain structure composition for facilitating a uniform microconstituent dispersion and alloying of the hard wear-resistant materials in the slurry composition. Also, such a desirable slurry should be of sufficiently optimum mesh size to provide a uniform microstructure and fine grain structure after fusion and thereby preventing and virtually eliminating the tendency for erosion and mechanical separation of refractory particles within the composition.

It is further very highly desirable to provide a hard facing composition adaptable for application in a slurry; which is inexpensive; easily applied to the base metal in a wide variety of thicknesses; substantially homogeneous and, therefore, not susceptible to liquid stratification; uniform in the finally applied stage to resist erosion, mechanical destruction under abrasive use, undercutting and mechanical separation; applicable for fusion with the base metal at a temperature sufficiently under the softening and warpage temperature of the base metal and at a temperature sufficiently under the temperature of the base metal to which it is to be applied; and more abrasive-resistant properties than compositions heretofore available.

In field tests, it has been demonstrated that an expensive high-nickel composition fusing at 1900+° F. completely wore off in about one-fourth to one-half of the service provided by the composition of this invention.

In particular, my first experiments with a high nickel alloy having a Rockwell "C" hardness as low as 50 and having the approximate proportions by weight as set forth below, proved it to be too soft for as much abrasion resistance as desired on discs and other farm tools.

|  | Percent |
|---|---|
| Carbon | .65 |
| Chromium | 14.00 |
| Silica | 4.00 |
| Manganese | .10 |
| Boron | 3.00 |
| Iron | 4.00 |
| Nickel | 74.25 |
|  | 100.00 |

In addition, high-nickel alloys as referred to above are too costly for the farm disc market. However, an advantage of the above high-nickel alloy, when applied and fused at a relatively low temperature—1900°–1950° F., is that it could be applied very smoothly and thinly, down to .001 of an inch thick.

On the other hand, the alloys of this invention as hereinafter illustrated, proved to be extremely hard, having microconstituent Rockwell "C" hardness values as high as 72. The hardness ultimately proved to be so high that when a thickness of .045" was applied, some small amount of intrafusion edge chippage resulted even though wear resistance was excellent.

Commonly and normally used abrasive-resistant refractory materials using tungsten carbide are expensive while boron is generally a relatively inexpensive element and in the particular alloy compositions used in this invention to form chromium borides and chromium carbides, develops excellent abrasion resistance as demonstrated by field tests but costs only a small portion of the tungsten carbide.

The hard facing composition of this invention comprises generally a single alloy powdered to a sieve size smaller than 100 mesh, and mixed with one or more fluxes. The alloy is basically composed of carbon, chromium, nickel, silica, manganese, boron and iron. An example of a flux for this composition is a mixture of potassium metaborate and potassium tetraborate pentahydrate.

Preferred forms of the composition are hereinafter set forth for the purpose of illustrating the invention. The general proportions by weight which may be utilized in the alloy of this invention are set forth below:

|  | Percent |
|---|---|
| Carbon | 1–3 |
| Chromium | 13–17 |
| Nickel | 3–7 |
| Silica | 3–7 |
| Manganese | .2–.5 |
| Boron | 2–4 |
| Iron | 65–75 |

The flux should make up about 3% of the composition with the potassium metaborate present in an amount twice that of the potassium tetraborate pentahydrate. The alloy is crushed and pulverized into particles of a size range having a sieve mesh size smaller than 100 mesh and larger than 325 mesh.

The powdered alloy mixed with the flux is in turn mixed with water to provide a slurry having from 8%–15% water by weight.

A first particular example embodiment of the composition of the single alloy, generally referred to above, that has been successfully used by the inventor in the slurry composition of this invention is set forth below in proportions by weight.

|  | Percent |
|---|---|
| Carbon | 2.18 |
| Chromium | 14.44 |
| Nickel | 5.72 |
| Silica | 3.09 |
| Manganese | .31 |
| Boron | 3.29 |
| Iron | 70.97 |
|  | 100.00 |

A second example embodiment of the composition of the single alloy, generally referred to above, that has been successfully used by the inventor in the slurry composition of this invention is set forth below in proportions by weight.

|  | Percent |
|---|---|
| Carbon | 2.00 |
| Chromium | 14.00 |
| Nickel | 6.00 |
| Silica | 2.25 |
| Manganese | .25 |
| Boron | 3.25 |
| Iron | 72.25 |
|  | 100.00 |

Another example embodiment of the composition of the single alloy, generally referred to above, that has been successfully used by the inventor in the slurry composition of this invention is set forth below in proportions by weight.

|            | Percent |
|---|---|
| Carbon | 1.25 |
| Chromium | 14.00 |
| Nickel | 5.75 |
| Silica | 3.25 |
| Manganese | .25 |
| Boron | 2.50 |
| Iron | 73.00 |
| | 100.00 |

The single alloy used to provide any one of the hard facing compositions of this invention may be prepared in a conventional manner. The alloy is then crushed, milled, and screened to a finer mesh than heretofore successfully utilized in hard facing compositions. In particular, the sieve mesh size range that the inventor found to be appropriate to most readily tend to prevent erosion of the particles of the slurry, both by the fluid of the slurry during application thereof to the surface to be hard faced and by wear on the hard faced surface by wear during use thereof, was a size substantially less than 100 mesh and larger than 325 mesh. A specific composite mesh size found to be most beneficial in this regard is as follows:

| Sieve mesh number: | Percent |
|---|---|
| Plus 100 | 1 |
| Plus 100 to 140 | 8 |
| Plus 140 to 200 | 22 |
| Plus 200 to 325 | 30 |
| Plus 325 | 39 |

After the single alloy of the hard facing composition of this invention is crushed, milled and screened to the fineness referred to above, the resulting powdered alloy is mixed with a flux constituting approximately 3% of the composition and comprising two parts potassium metaborate and one part potassium tetraborate pentahydrate. The flux is then mixed with 8% to 15% of water by weight to provide a desirable viscosity for a slurry. Suspension agents such as bentonite clay are added in the amount of 1% by weight, and the slurry is applied at .010″ and .020″ thicknesses to the cutting surface of a tillage disc. The coated surface is then heated to a temperature sufficient to fuse the hard facing composition to the cutting surface of the disc. The tillage discs which have had the hard facing composition of this invention thus applied thereto have been used for cultivation field tests on over 20,000 acres of various types of soil. The discs showed excellent wear and abrasion resistance with substantially no chipping or edge spalling.

It should be noted that the hard facing slurry, as set forth by this invention, provides a hard facing composition which has several advantages over the known types of existing slurries that are proposed for hard facing purposes. In particular, the slurry of this invention, due to its metallic composition, provides a much greater wear-resistant surface area. Also, due to the substantially homogeneous nature of the metallic composition and the substantially uniform small particle size of the metallic powder, the slurry of this invention is less subject to fluid erosion and separation during the application thereof to the metal to be hard faced as well as abrasive erosion during the utilization of the hard faced surface.

More specifically, the slurry is derived from a single alloy rather than mixtures of two or more separate alloys of different densities and hardnesses as in other slurries, and is pulverized to a relatively fine sieveness size ranging from 100 to 325. Thus, the slurry of this invention will have very little tendency to stratify during preparation and application, and will have a much lower viscosity than known slurries, so as to be more readily utilized where very thin hard facing is desirable.

It is to be understood that the invention is not to be limited to the specific constructions and arrangements shown and described, as it will be understood to those skilled in the art that certain changes may be made without departing from the principles of the invention.

What is claimed is:

1. A hard facing alloy slurry for application and fusion to a metal base to resist abrasion comprising:
   (a) a powdered alloy having a composition by weight of 1% to 3% carbon; 13% to 17% chromium; 3% to 7% nickel; 3% to 7% silica; 0.2% to 0.5% manganese; 2% to 4% boron; and 65% to 75% iron;
   (b) about 3% of a potassium borate flux;
   (c) up to about 15% by weight of water as a liquid vehicle; and
   (d) about 1% bentonite clay as a suspension agent.

2. A hard facing alloy slurry as recited in claim 1 in which said alloy by weight comprises 2% carbon, 14% chromium, 6% nickel, 2.25% silica, .25% manganese, 3.25% boron and 72.25% iron.

3. A hard facing alloy slurry as recited in claim 1 in which said alloy by weight comprises 1.25% carbon, 14% chromium, 5.75% nickel, 3.25% silica, .25% manganese, 2.5% boron and 73% iron.

4. A method of providing at least a portion of a metal base with a fused hard facing having a Rockwell C hardness on the order of 72 comprising applying in a single application to said base portion a layer about 0.001 inch to about 0.045 inch in thickness of a slurry containing:
   (a) a powdered alloy having a composition by weight of 1% to 3% carbon; 13% to 17% chromium; 3% to 7% nickel; 3% to 7% silica; 0.2% to 0.5% manganese; 2% to 4% boron; and 65% to 75% iron;
   (b) about 3% of a potassium borate flux;
   (c) up to about 15% by weight of water as a liquid vehicle; and
   (d) about 1% bentonite clay as a suspension agent;
   then heating said base and said layer to a temperature sufficient to fuse said layer to said base and below the melting temperature of said base.

5. A method as recited in claim 4 in which said alloy by weight comprises 2% carbon, 14% chromium, 6% nickel, 2.25% silica, .25% manganese, 3.25% boron and 72.25% iron.

6. A method as recited in claim 4 in which said alloy by weight comprises 1.25% carbon, 14% chromium, 5.75% nickel, 3.25% silica, .25% manganese, 2.5% boron and 73% iron.

References Cited
UNITED STATES PATENTS

| | | | |
|---|---|---|---|
| 2,694,647 | 11/1954 | Cole | 117—131 |
| 2,611,710 | 9/1952 | Woock | 106—1 |
| 2,868,667 | 1/1959 | Bowles | 117—131 |
| 3,056,693 | 10/1962 | Woock | 117—131 |
| 3,406,028 | 10/1968 | Woock | 106—1 |
| 1,422,096 | 7/1922 | Girin | 51—309.1 |
| 2,006,162 | 6/1935 | Fuchs | 51—309.1 |
| 2,145,756 | 1/1939 | Ervin | 51—309.1 |
| 2,171,081 | 8/1939 | Ervin | 51—309.1 |
| 2,529,722 | 11/1950 | Chester | 51—309 |

DONALD J. ARNOLD, Primary Examiner

U.S. Cl. X.R.

117—46, 131, 160